US012462655B1

(12) United States Patent
Reilly

(10) Patent No.: US 12,462,655 B1
(45) Date of Patent: Nov. 4, 2025

(54) HAPTIC FEEDBACK FROM AUDIO STIMULI

(71) Applicant: Two Six Labs, LLC, Arlington, VA (US)

(72) Inventor: Nash Reilly, Malden, MA (US)

(73) Assignee: Two Six Labs, LLC, Arlington, VA (US)

( * ) Notice: Subject to any disclaimer, the term of this patent is extended or adjusted under 35 U.S.C. 154(b) by 167 days.

(21) Appl. No.: 18/240,825

(22) Filed: Aug. 31, 2023

(51) Int. Cl.

| | |
|---|---|
| ***G08B 6/00*** | (2006.01) |
| ***H04R 1/40*** | (2006.01) |
| ***H04R 3/00*** | (2006.01) |

(52) U.S. Cl.
CPC ............... *G08B 6/00* (2013.01); *H04R 1/406* (2013.01); *H04R 3/005* (2013.01)

(58) Field of Classification Search
None
See application file for complete search history.

(56) References Cited

U.S. PATENT DOCUMENTS

| | | | | |
|---|---|---|---|---|
| 2017/0025042 | A1* | 1/2017 | Chen | G09B 21/009 |
| 2017/0374455 | A1* | 12/2017 | Shastry | H04R 3/005 |
| 2018/0262849 | A1* | 9/2018 | Farmani | H04R 25/407 |
| 2019/0208854 | A1* | 7/2019 | Teetzel | A42B 3/0433 |

* cited by examiner

*Primary Examiner* — John F Mortell
(74) *Attorney, Agent, or Firm* — Armis IP Law, LLC

(57) ABSTRACT

A wearable device generates haptic feedback around a 360 degree range for indicating an audio stimuli. The user/wearer receives the haptic feedback for indicating a direction from which the audio stimuli emanated. A helmet housing the device includes vibratory elements arranged in a circular frame responsive to microphones around an outer perimeter of the helmet. The frame fits snugly over a user's head, and upon detection of a distal sound by the microphones, computes and activates vibratory element corresponding to the source of the sound. The vibratory elements are arranged in a circular array, and a signal processor is particularly tuned for detecting a sharp sound such as gunfire or munition explosion. Successive sounds are followed by the haptic feedback as the user turns their head. In a tactical environment, the frame may be mounted inside a helmet and the microphones placed around the outer helmet perimeter.

17 Claims, 6 Drawing Sheets

REPLACEMENT FIGURES

HAPTIC FEEDBACK FROM AUDIO STIMULI

BACKGROUND

Haptic feedback induces a touch sensation in response to some external stimuli, as opposed to visual, audio or other sensory stimuli. Haptic feedback is often used in handheld devices and touch panels to generate a vibratory sensation for enhancing a user experience or attention, and often accompanies a corresponding visual or audible signal, such as in a video game controller for alerting the user to particular events, or dashboard a control panel on an automobile.

SUMMARY

A wearable device generates haptic feedback around a 360 degree range for indicating a direction of a source of audio stimuli. The user/wearer receives haptic feedback for indicating a direction from which the audio stimuli emanated. A helmet housing the device includes vibratory elements arranged in a circular frame responsive to microphones around an outer perimeter of the helmet. The frame fits snugly over a user's head, and upon detection of a distal sound by the microphones, computes and activates vibratory element corresponding to the source of the sound. The vibratory elements are arranged in a circular array, and a signal processor is particularly tuned for detecting a sharp sound such as gunfire or munition explosion. The haptic feedback remains fixed on the source as the user turns their head by successively actuating the vibratory elements corresponding to the source direction. In a tactical environment, the frame may be mounted inside a helmet and the microphones placed around the outer helmet perimeter.

Configurations herein are based, in part, on the observation that haptic feedback is often provided as a useful accompaniment to a user interface on a device or panel, particularly on a so-called "touch" panel where physical button or electrical contact motion has been replaced by capacitive or thermal sensing of a finger. A touch sensation completes the user experience of having activated the desired feature. Unfortunately, conventional approaches to haptic feedback suffer from the shortcoming that they often do not extend to wearable items. This useful sensory perception allows another human sensory system (touch for alerting users/wearers of eminent hazards.

In a tactical environment, sounds related to harmful activity, such as gunfire, explosions, and other forms of detonation emanate a sharp detectable sound. Conventional devices such as directional antennas and microphones have been employed to attempt to locate the source of such sounds, however these conventional devices are hand held or console based, and graphically compute and render a direction or coordinate on a visual screen. This input must then be assimilated and acted upon by a human respondent. In a hazardous environment, for example, by the time the user identifies a direction of gunfire, there may be insufficient response time until a successive gunshot is fired.

Accordingly, configurations herein substantially overcome the shortcomings of conventional sound or directional analysis devices by providing an integrated, wearable haptic array and rotational detection for generating rapid haptic feedback about the direction of a gunshot or other sharp sound indicative of a hazard. Initial positional information conveyed by the circular haptic array immediately alerts a wearer as to the direction from which the sound emanated, and an accelerometer "follows" the sound as the user turns their head for denoting when the user is facing the source of the sound.

In further detail, configurations herein support a system and wearable device for generating haptic feedback in response to an external stimuli such as a gunshot sound. A particular configuration includes a circular frame adapted for engaging a head of a user, and a plurality of sensing elements disposed on a perimeter of the circular frame for defining a beamforming sensory array. A plurality of feedback elements is also disposed on the circular frame for haptic user interface (UI) sensations. A sensory processor in communication with the plurality of sensing elements is configured to compute an angle of arrival of the audio input based on a sensed audio signal received by the plurality of sensing elements. A directional processor is configured for actuating at least one of the feedback elements responsive to the computed angle of arrival from where the gunshot emanated.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An example of the disclosed approach follows. The haptic feedback device may be embodied in a user interface (UI) for wearable gunshot detection and direction finding, particularly for a soldier or law enforcement agent. The system uses digital signal processing of a microphone array to calculate direction of gunfire based on the arriving sound of a gunshot, then direct the wearer's attention to the source of the gunfire using haptic (i.e. vibrational) cues from the inside of a helmet. The helmet deployment of the haptic feedback device disposes a circular band inside the helmet for mounting haptic feedback elements, and microphone sensors on an exterior surface for facilitating sound sensitivity.

Figure 1:
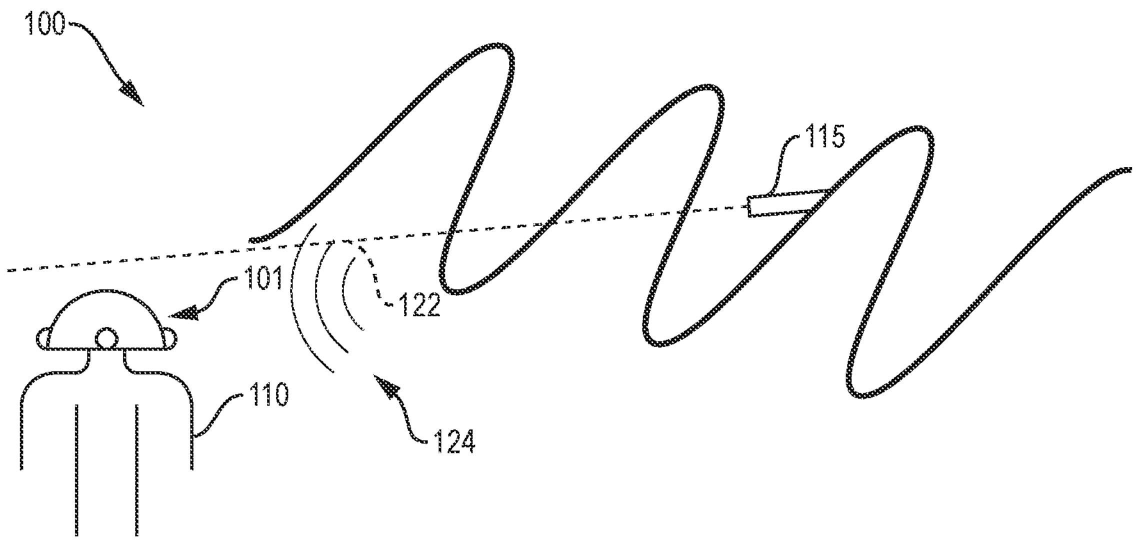
FIG. 1 is a context diagram of the haptic feedback device in a tactical environment as disclosed herein.

FIG. 1 is a context diagram of the haptic feedback device 101 in a tactical environment 100 as disclosed herein. In the tactical environment 100, wearers (users) 110 of the device 101 are typically soldiers wary of hostile events such as gunfire, artillery fire or other munition activity. Particularly in uneven or mountainous terrain, hazards such as a barrel 115 of an adversary gun may be difficult to detect or identify from a distance. In any hazardous forward area, gunfire may erupt from any direction, and it is beneficial if the wearer is alerted to a path 122 of a gunshot denoting a source and direction.

Even in non-tactical environments, it can be beneficial to provide rapid detection of a direction source of a sharp or loud noise. In an industrial environment, for example a sharp noise may be indicative of an equipment failure or a release of a heavy object. It is beneficial to allow the user to identify a direction from which a sharp noise emanates. Configurations herein provide the wearable device 101 for generating haptic feedback in response to an external stimuli 124, such as the sound of a gunshot. The device includes a circular frame adapted for engaging a head of a user, and a plurality of sensing elements disposed on a perimeter of the circular frame. The plurality of feedback elements disposed on the circular frame generate a haptic response to indicate the direction of an external audio source. Alternate configurations may employ other sensory arrays, such as optical or light sensors for identifying a muzzle or artillery flash. Similarly, any suitable haptic feedback element may suffice, and may be mounted in a vest or torso area as an alternative to a helmet implementation.

In a practical implementation, the device takes the form of a helmet or headgear, where the circular frame has two levels—an outer perimeter defined by the external helmet surface, with microphones mounted on the surface for improved reception of sharp audio signals, and a inner wearable component. In order to function as a wearable device, the circular frame includes a wearable component such as a flexible or elastic band for engaging the wearer's head. Feedback elements include vibrational elements for issuing a vibratory sensation around the circular frame at a location indicative of the source of the detected sound.

Figure 2:
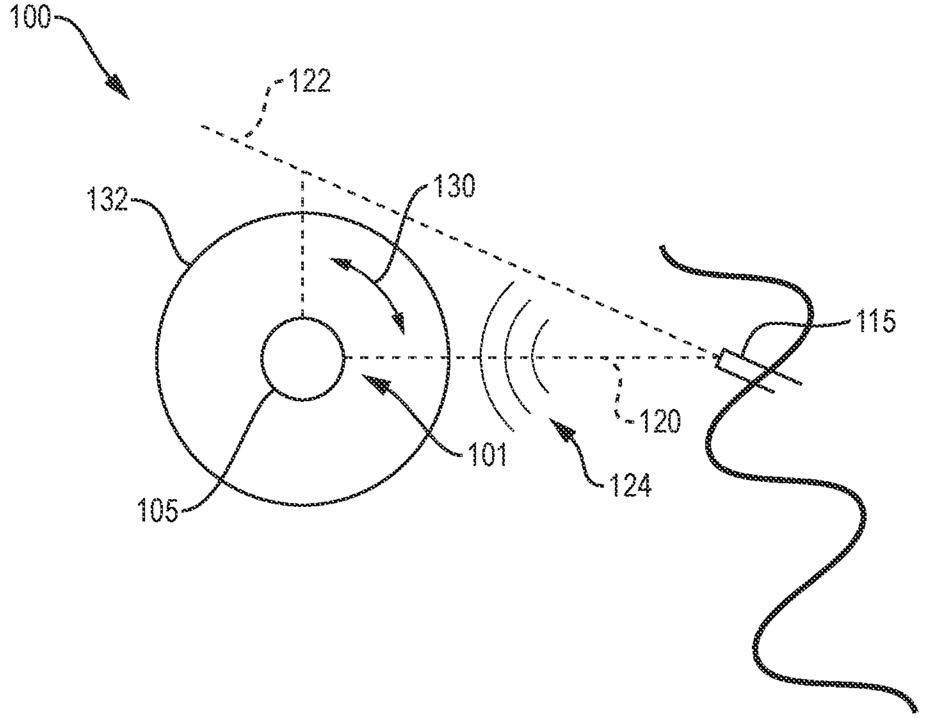
FIG. 2 is a plan view of the haptic feedback device deployed in a helmet in a tactical environment showing the direction from the source.

FIG. 2 is a plan view of the haptic feedback device deployed in a circular frame 105 (frame) in the tactical environment 100 showing the direction from the source. The system employs an array of circularly arranged microphones to constantly listen to and analyze the ambient soundscape. When a gunshot 120 is detected, signal processing of the system results in several actions:

1. An angle of arrival 130 of the sound stimuli 124 is calculated using audio data from the microphone array, relative to the field of view 132 of the helmet assessing a full 360 degree range; and 2. A haptic motor inside of the helmet is activated, delivering a haptic stimulus corresponding to the shot's direction of arrival.

As the wearer turns their head and helmet towards the source of the sound, the haptic signal "moves" along with them, corresponding to the direction of the gunshot relative to the field of view of the helmet. When the wearer is facing the calculated source of the gunshot, the haptic vibration will be in the front of their head, approximately at the center of the wearer's forehead. Each sensing element of the plurality of sensing elements are typically microphones configured for receiving the audio signal stimuli 124 emanating from a distal location defining the angle of arrival 130. Other suitable sensors may be employed, depending on the sound stimuli 124 sought to be sensed. Firearms and artillery fire generally deliver a sharp "crack" that is easily detectable.

Figure 3:
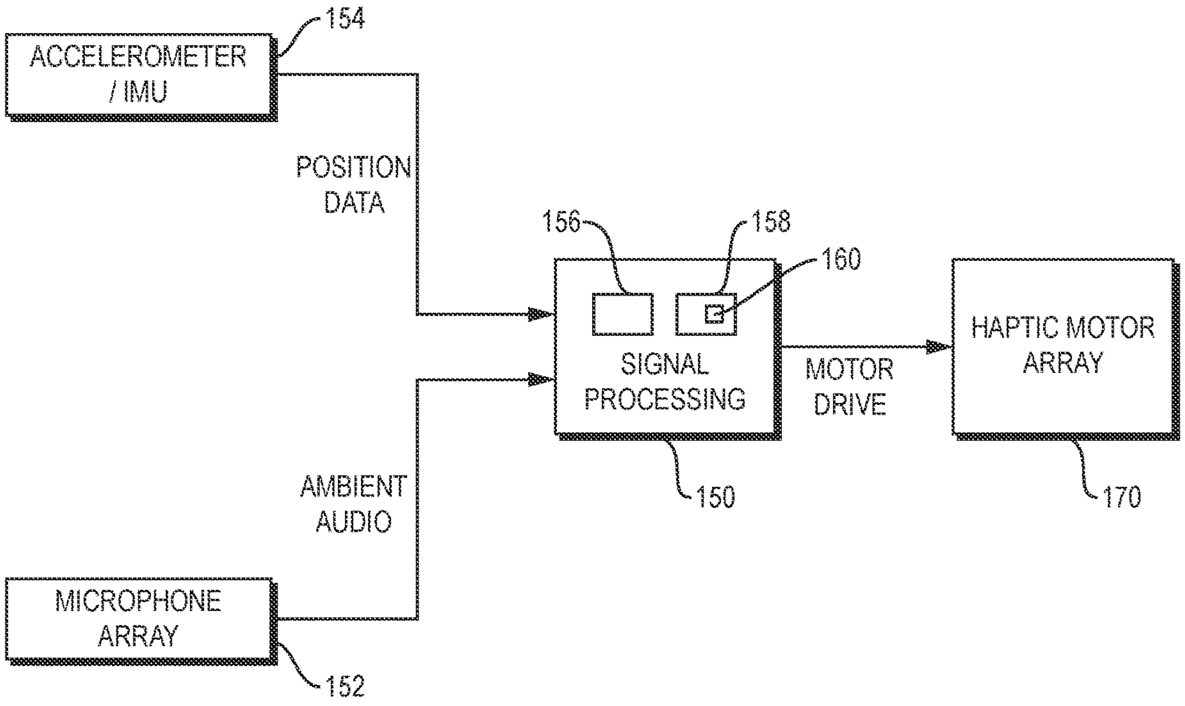
FIG. 3 is a block diagram of the logic components in the helmet of FIG. 2.

FIG. 3 is a block diagram of the logic components in the helmet of FIG. 2. Referring to FIGS. 1-3, a signal processing element 150 includes a sensory processor 156 in communication with the plurality of sensing elements 152 such as a microphone array, and a directional processor 158 configured for actuating at least one of the feedback elements 170 responsive to the computed angle of arrival. The sensory processor 156 is includes angular response logic 160 configured to compute an angle of arrival of an audio input based on a sensed audio signal received by the plurality of sensing elements 152. An accelerometer 154 on the frame provides inertial signals to the directional processor to actuate feedback elements 170 corresponding to the computed angle of arrival as the frame rotates, responsive to the wearer turning their line of sight towards the angle of arrival.

Figure 4A:
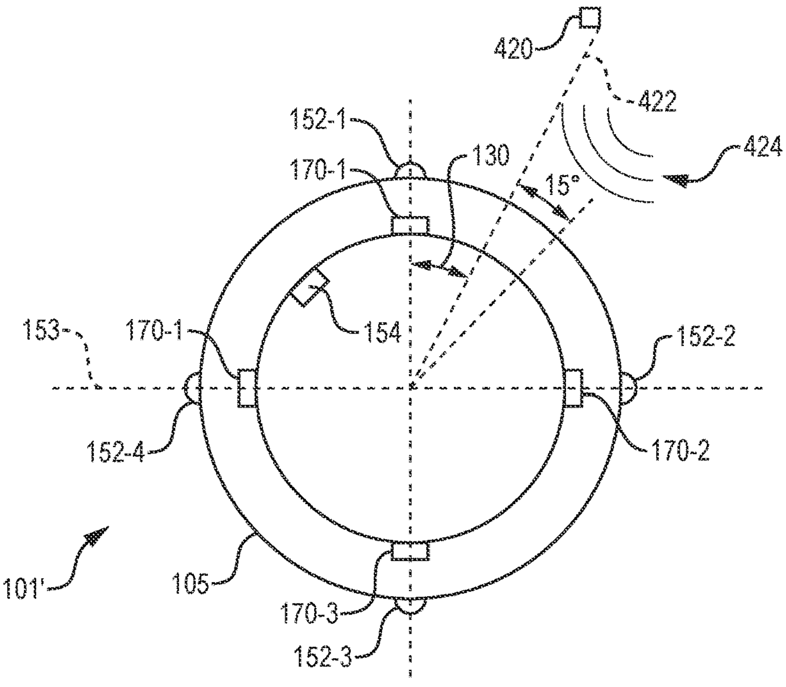
FIGS. 4A and 4B are a schematic diagram of helmet operation as in FIGS. 1-3.
Figure 4B:
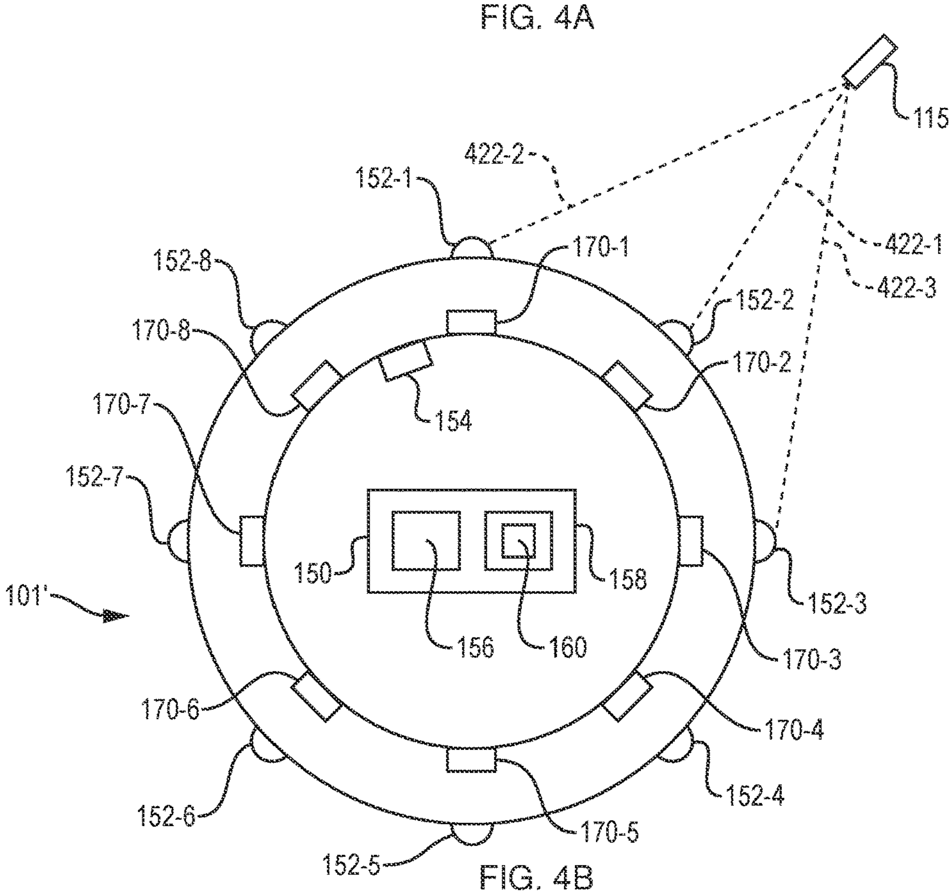

FIGS. 4A and 4B are a schematic diagram of helmet operation as in FIGS. 1-3. Referring to FIGS. 1-4B, configurations herein depict the device 101 as a wearable helmet 101'. The helmet 101' includes a circular array of sensing elements 152-1 . . . 152-N (152 collectively) disposed around the circular frame 105. The accelerometer 154 couples to the directional processor 158 for detecting a change in the angle of orientation resulting from rotation of the circular array 152. The directional processor 158 is configured to actuate the feedback element 170-N having an angle of orientation with a greatest correspondence to the angle of arrival 130 after a change in the angle of orientation. The accelerometer 154 is mounted offset from a center of the circular frame 105 to be sensitive to head-turning of the wearer.

In the helmet 101' of FIG. 4A, the sensing elements 152 are microphones defining a beamforming array around the circular frame. The helmet of FIG. 4A shows 4 sensing elements 152-1 . . . 152-4 with 4 feedback elements 170-1 . . . 170-4. Any suitable number of sensing elements may be employed. In FIG. 4A, a sound origin 420 emanates a sound signal 424. The microphone of the beamforming array located closest to the distal location, shown by sensing element 152-1, receives the audio signal before others of the plurality of sensing elements, specifically the microphones at 152-2 and 152-4, while most distal microphone receives the sound last, shown by sensing element 152-3. The angular response logic 160 identifies the angle of arrival, shown by trajectory path 422, and then determine an angle of orientation of each sensing element 152 of the plurality of sensing elements based on a location around the circular frame. In the example of FIG. 4, angular orientations are depicted by a coordinate grid 153 showing 0° corresponding to element 152-1 (upwards on the printed page); the angle of arrival is around 30°. The closest feedback element is 170-1. The actuate the feedback element based on the angle of orientation having a greatest correspondence with the angle of arrival. The angular response logic 160 is configured compute an intensity for each sensing element, based on a correspondence to the angle of arrival, and actuate each feedback element 170-N with an intensity relative to the of the respective angle of orientation of the feedback element to the angle of arrival. In FIG. 4A, feedback element 170-1 is closest aligned with the angle of arrival at an offset of 30°, and would be activated with the greatest intensity. Next closest feedback element is 170-2, offset by 60°. The directional processor 158 actuates a first feedback element at a greater intensity than a second feedback element based on the angle of arrival. Feedback element 170-2 would actuated at a lower intensity or not at all.

The haptic response "follows" the sound source (shot) as the head turns, hence as the wearer turns towards the source 120 (based on a forward line of sight), the accelerometer 154 senses and reports the rotation such that the feedback element 170-N most aligned with the angle of arrival would activate. Referring again to the example of FIG. 4A, a head turn counterclockwise more than 15° would move the feedback element 170-2 to have an angle of orientation more aligned with the angle of arrival 422, and would be activated. In general, the second feedback element 170-2 would then be actuated at a greater intensity than the first feedback element 170-1 based on a rotational signal from the accelerometer 154.

The example of FIG. 4A depicts 4 sensory elements 152 (microphones) and 4 feedback elements (vibrational modules or vibratory motors) 170. This yields an effective granularity of 90° of sensitivity for each feedback element. Any suitable number of sensory elements and feedback elements may be employed, and they need not be of equal number, as now depicted with respect to FIG. 4B.

FIG. 4B illustrates a higher granularity with 8 microphones and 8 haptic motors (vibratory elements). The signal processor 150, including the sensory processor 156 and directional processor 158 with angular response logic 160, may be packaged in a central location in the helmet. The angle of arrival denoted by the path 422-1 causes the audio signal 424 to be received first at sensory element 152-2. Sensory element 152-1 lies on next nearest path 422-2, and sensory element 152-3 being third closest along path 422-3.

Figure 5:
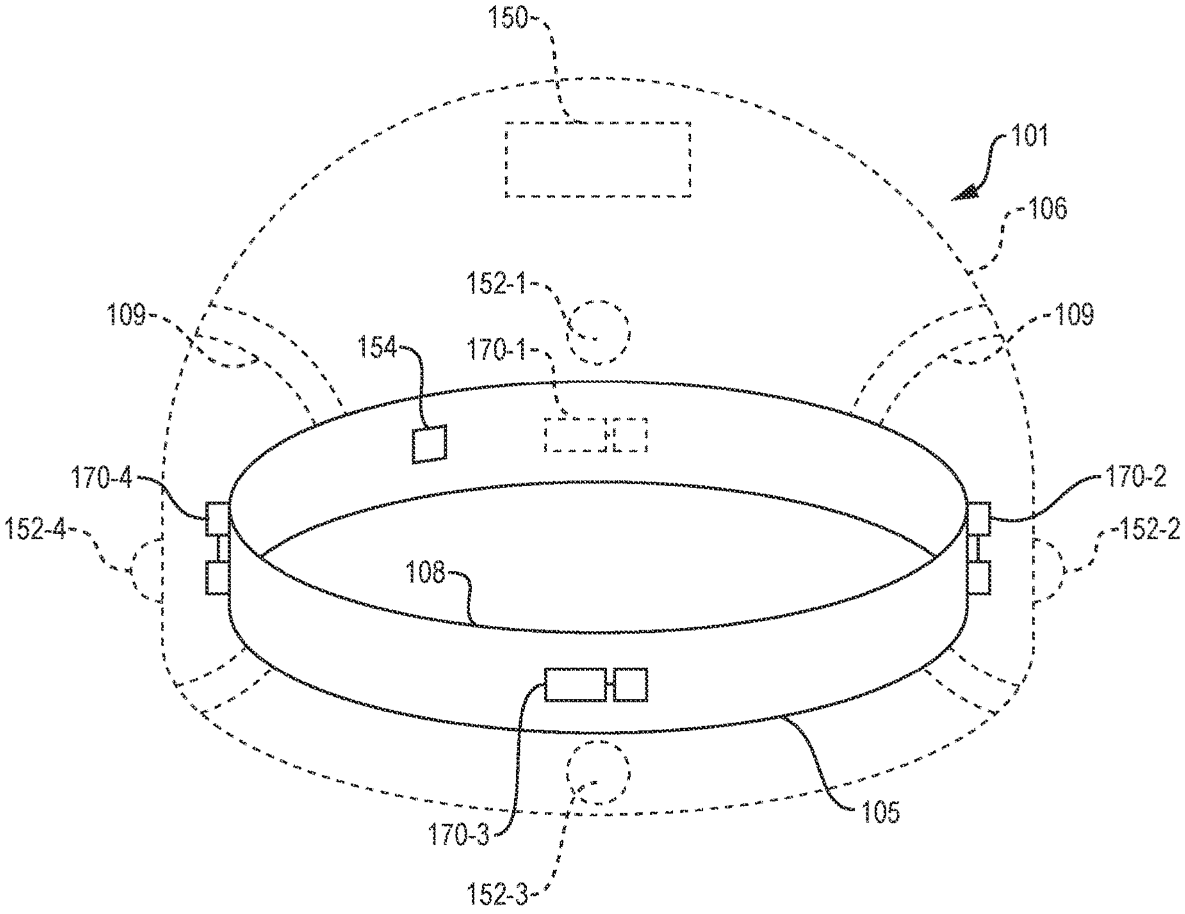
FIG. 5 is a side transparent view of the helmet of FIGS. 1-5.

FIG. 5 is a side transparent view of the helmet of FIGS. 1-5. Referring to FIGS. 1-5, the circular frame 105 includes an outer shell 106 defined by a hard protective helmet, and an inner frame including a circular band 108 sized for engaging a head of a user. Sensory elements 152-N attach to the outer perimeter surface of the shell 106 for maximum sensitivity. The circular frame is sized for engagement with a user's head and the feedback elements 170 are attached to the band 108 and configured to emanate a vibratory sensation at the position of the feedback element on the frame. Tethers or straps 109 complete the assembly with the outer shell 106. A textile or elastic band may be used to ensure a snug fit, and for disposing the feedback elements 170, such as vibratory haptic motors, in communication with the head for sensing by the user.

Figure 6:
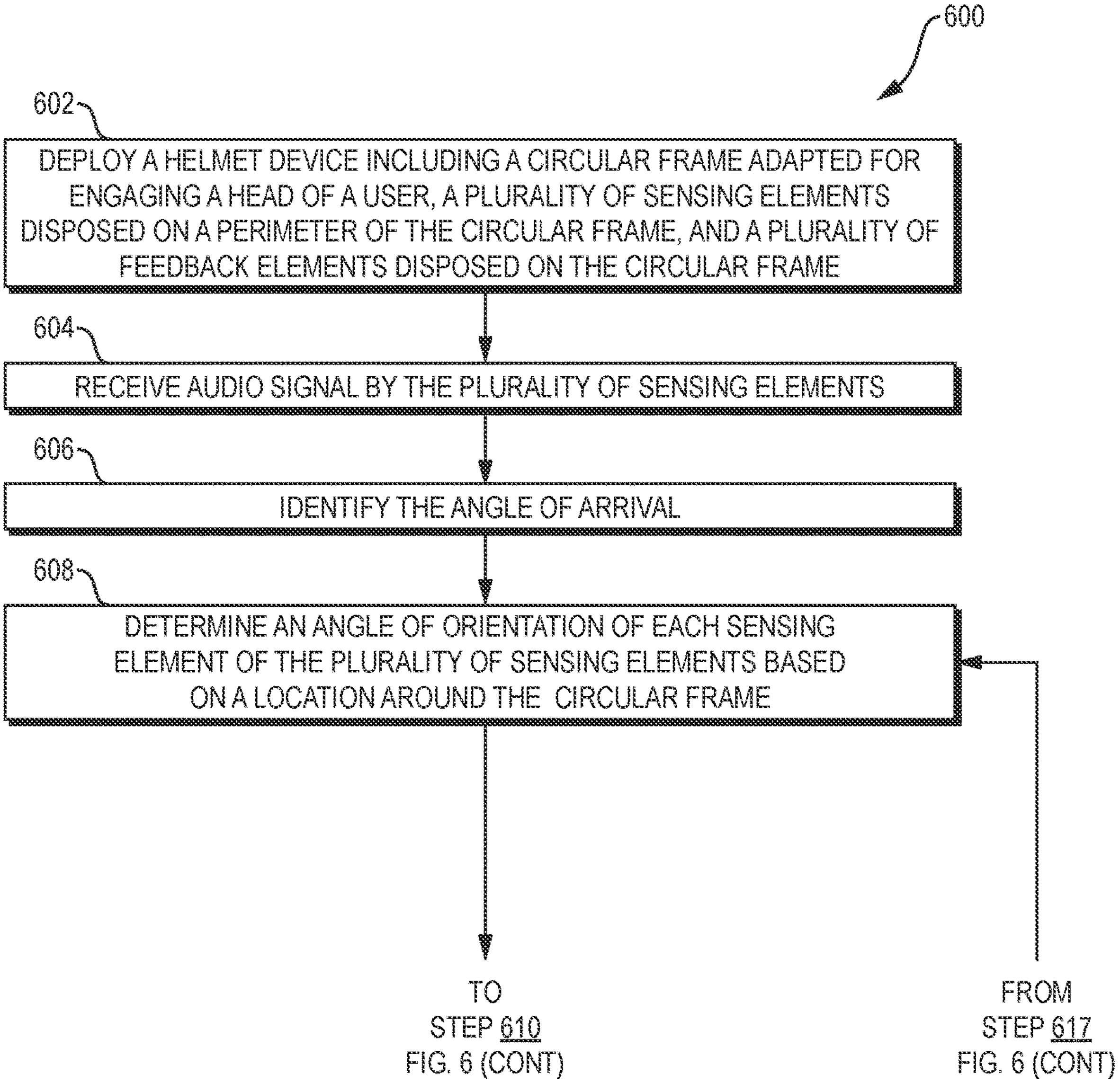
FIG. 6 is a flowchart of helmet operation.
Figure 6:
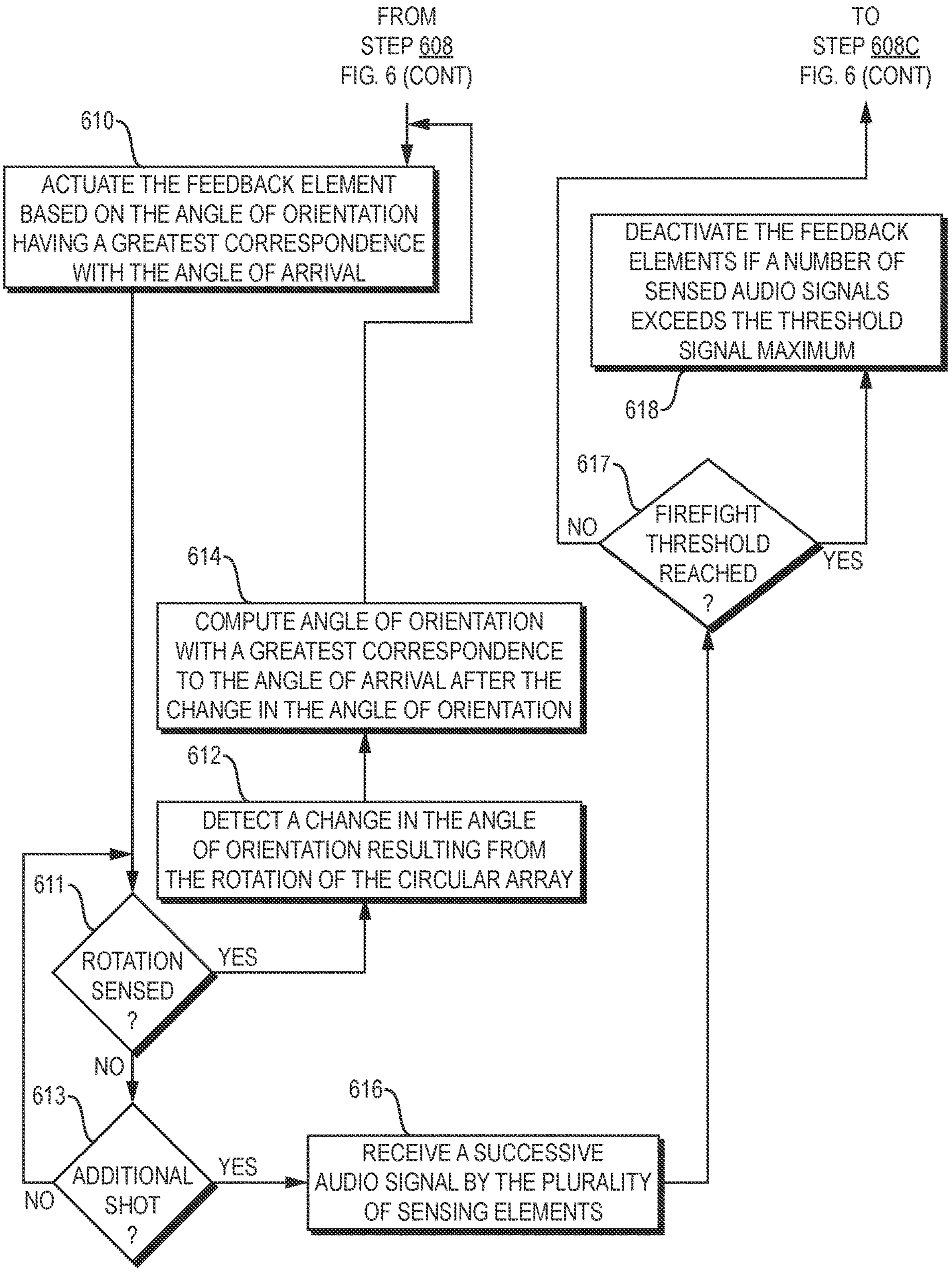

FIG. 6 is a flowchart of helmet operation including the angular response logic 160. Referring to FIGS. 1-6, a stepwise sequence of a typical use case is described as a non-limiting example. Other scenarios and ordering of actions may occur from the device as disclosed herein. At step 602, the helmet device 101 is deployed in a tactical environment 100. The helmet device includes a circular frame 105 adapted for engaging a head of a user. The circular frame employs the plurality of sensing elements 152-1 . . . 152-N disposed on the perimeter of the helmet, and a plurality of feedback elements 170-1 . . . 170-N disposed on the circular frame 105 and in communication with the wearer's head. An offensive action such as a gunshot emanates an audio signal 124, and the audio signal is received by the plurality of sensing elements 152, as depicted at step 604.

Based on the directional array formed by the sensing elements 152, the signal processor 150 identifies the angle of arrival, as depicted at step 606, and may be an angular or coordinate based value relative to the circular array. Generally, the sensing elements 152 are microphones, and the directional array provides that the direction the sound emanates from will reach the closest microphone first, as described above.

Each of the feedback elements 170 is mounted in a particular orientation on the frame encircling the wearers head. Whichever feedback element is most closely aligned with the direction of the incoming shot will be activated to indicate the source direction. Accordingly, the directional processor 158 determines an angle of orientation of each sensing element 152-N of the plurality of sensing elements 154 based on a location around the circular frame 105, as depicted at step 608. The directional processor 158 actuates the feedback element based on the angle of orientation having a greatest correspondence with the angle of arrival, as shown at step 610. A check is performed, at step 611, for angular rotation of the frame 105. Upon hearing the noise, a typical response is to turn the head to observer the source direction. The accelerometer 154 detects a change in the angle of orientation resulting from rotation of the circular array 105, as shown at step 612, and actuates the feedback element having an angle of orientation with a greatest correspondence to the angle of arrival after the change in the angle of orientation, depicted at step 614.

In no angular rotation change is detected, a check is performed, at step 613, for receiving a successive sensed audio signal received by the plurality of sensing elements. In a tactical environment, successive gunshots may emanate from the same or different sources at any time. The array of sensing elements 152 receives a successive audio signal 124, as disclosed at step 616, and a check is performed for a firefight, at step 617. If an excessive number of audio signals is delivered in rapid succession, the haptic feedback becomes excessive, sensory input is deemed saturated and can overload the user, negating the usefulness of carefully honed feedback. If a threshold number of gunshots is detected within a given interval, the signal processor 150 deactivates the feedback elements 170 based on the number of sensed audio signals 124 exceeding the threshold signal maximum, as shown at step 618. Otherwise, control reverts to step 608 to generate haptic directional feedback for the successive gunshot.

In the event of multiple gunshots, the angular response logic first actuates a feedback element having a greatest correspondence to the angle of arrival with a greater intensity, and reduce the intensity over time. If a second audio signal triggers gunshot detection, the response logic actuates the feedback elements based on the more recent gunshot, and winds down a feedback element with a lesser correspondence to the angle of arrival at a lower intensity. In other words, the angular response logic is configured to reduce an intensity of the of the feedback based on a time duration from arrival of the audio input. In this manner, the greatest, or most intense, haptic feedback is aligned with the direction of the most recent audio signal.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A wearable device for generating haptic feedback in response to an external stimuli, comprising:

a circular frame adapted for engaging a head of a user;

a plurality of sensing elements disposed on a perimeter of the circular frame;

a plurality of feedback elements disposed on the circular frame;

a sensory processor in communication with the plurality of sensing elements, the sensory processor configured to compute an angle of arrival of an audio input based on a sensed audio signal received by the plurality of sensing elements;

a directional processor configured for actuating at least one of the feedback elements responsive to the computed angle of arrival, the directional processor configured to actuate a first feedback element at a greater intensity than a second feedback element based on the angle of arrival; and an accelerometer on the frame, the directional processor responsive to the accelerometer and configured to actuate the second feedback element at a greater intensity than the first feedback element based on a rotational signal from the accelerometer.

2. The device of claim 1 further comprising angular response logic, the angular response logic configured to:

identify the angle of arrival;

determine an angle of orientation of each sensing element of the plurality of sensing elements based on a location around the circular frame; and actuate the feedback element based on the angle of orientation having a greatest correspondence with the angle of arrival.

3. The device of claim 2 wherein the angular response logic is configured to:

compute an intensity for each sensing element, based on a correspondence to the angle of arrival; and actuating each feedback element with an intensity relative to a respective angle of orientation of the feedback element to the angle of arrival.

4. The device of claim 2 further comprising:

a circular array of sensing elements disposed around the perimeter; and an accelerometer, the accelerometer coupled to the directional processor for detecting a change in the angle of orientation resulting from rotation of the circular array, the feedback element configured to actuate the feedback element having an angle of orientation with a greatest correspondence to the angle of arrival after the change in the angle of orientation.

5. The device of claim 2 wherein the angular response logic is further configured to:

actuate a feedback element having a greatest correspondence to the angle of arrival with a greater intensity; and actuate a feedback element with a lesser correspondence to the angle of arrival at a lower intensity than the greater intensity.

6. The device of claim 1 wherein the circular frame is sized for engagement with a user's head and the feedback element is configured to emanate a vibratory sensation at the position of the feedback element on the frame.

7. The device of claim 1 wherein the sensing elements of the plurality of sensing elements are microphones configured for receiving an audio signal emanating from a distal location defining the angle of arrival.

8. The device of claim 7 wherein the microphones define a beamforming array around the circular frame, a microphone of the beamforming array located closest to the distal location receiving the audio signal before others of the plurality of sensing elements.

9. A wearable device for generating haptic feedback in response to an external stimuli, comprising:

a circular frame adapted for engaging a head of a user;

a plurality of sensing elements disposed on a perimeter of the circular frame;

a plurality of feedback elements disposed on the circular frame;

a sensory processor in communication with the plurality of sensing elements, the sensory processor configured to compute an angle of arrival of an audio input based on a sensed audio signal received by the plurality of sensing elements;

a directional processor configured for actuating at least one of the feedback elements responsive to the computed angle of arrival; and angular response logic is configured to reduce an intensity of the of the feedback based on a time duration from arrival of the audio input.

10. The device of claim 1 wherein the circular frame includes an outer shell defined by a helmet, and an inner frame including a circular band sized for engaging a head of a user.

11. A wearable device for generating haptic feedback in response to an external stimuli, comprising:

a circular frame adapted for engaging a head of a user;

a plurality of sensing elements disposed on a perimeter of the circular frame;

a plurality of feedback elements disposed on the circular frame;

a sensory processor in communication with the plurality of sensing elements, the sensory processor configured to compute an angle of arrival of an audio input based on a sensed audio signal received by the plurality of sensing elements;

a directional processor configured for actuating at least one of the feedback elements responsive to the computed angle of arrival; and saturation logic, the saturation logic having a threshold signal maximum, the signal processor deactivating the feedback elements if a number of sensed audio signals exceeds the threshold signal maximum.

12. A method for generating haptic feedback in response to a received signal, comprising:

disposing a plurality of sensing elements on a perimeter of a circular frame;

disposing a plurality of feedback elements on the circular frame, the circular frame adapted for engaging a user;

receiving an external signal emanating from a distal source;

computing an angle of arrival based on receipt of the external signal by the plurality of sensing elements;

actuating a first feedback element at a greater intensity than a second feedback element based on the angle of arrival; and actuating the second feedback element at a greater intensity than the first feedback element based on a rotational signal from an accelerometer.

13. The method of claim 12 further comprising determining an angle of orientation of each sensing element of the plurality of sensing elements based on a location around the circular frame; and actuating the feedback element based on the angle of orientation having a greatest correspondence with the angle of arrival.

14. The method of claim 13 further comprising computing an intensity for each sensing element, the intensity based on a correspondence of the angle of orientation to the angle of arrival; and actuating each feedback element with the respective intensity.

15. The method of claim 12 further comprising detecting a change in an angle of orientation resulting from rotation of the circular array; and actuating the feedback element having an angle of orientation with a greatest correspondence to the angle of arrival after the change in the angle of orientation.

16. The method of claim 12 wherein the sensing elements of the plurality of sensing elements are microphones configured for receiving an audio signal emanating from a distal location defining the angle of arrival.

17. A computer program embodying program code on a non-transitory computer readable storage medium that, when executed by a processor, performs steps for generating haptic feedback in response to a received signal, the method comprising:

disposing a plurality of sensing elements a perimeter of a frame, the frame adapted for rotation;

disposing a plurality of feedback elements on the circular frame, the frame adapted for engaging a user;

receiving an external signal emanating from a distal source;

computing an angle of arrival based on receipt of the external signal by the plurality of sensing elements; and actuating a first feedback element at a greater intensity than a second feedback element based on the angle of arrival; and actuating the second feedback element at a greater intensity than the first feedback element based on a rotational signal from an accelerometer.

* * * * *